July 15, 1924.

F. A. TEFFT 1,501,250

EXTENSIBLE SWITCH BOX

Filed July 18, 1921

2 Sheets-Sheet 1

INVENTOR.
Frederick A. Tefft
by
Owen, Owen & Crampton.

July 15, 1924.

F. A. TEFFT 1,501,250

EXTENSIBLE SWITCH BOX

Filed July 18, 1921     2 Sheets-Sheet 2

INVENTOR.
Frederick A. Tefft.
by
Owen, Owen & Crampton

Patented July 15, 1924.

1,501,250

UNITED STATES PATENT OFFICE.

FREDERICK A. TEFFT, OF TOLEDO, OHIO, ASSIGNOR TO ABRAHAM SMILACK, OF TOLEDO, OHIO.

EXTENSIBLE SWITCH BOX.

Application filed July 18, 1921. Serial No. 485,741.

*To all whom it may concern:*

Be it known that I, FREDERICK A. TEFFT, a citizen of the United States, and a resident of Toledo, in the county of Lucas and State of Ohio, have made an invention appertaining to Extensible Switch Boxes; and I do hereby declare the following to be a full, clear, and exact description of the invention, such as will enable others skilled in the art to which it appertains to make and use the same, reference being had to the accompanying drawings and to the characters of reference marked thereon, which form a part of this specification.
My invention has for its object to provide a switch box that may be readily extended by the addition of duplicate parts, the parts being secured together without the use of screws and bolts. The invention particularly has for its object to provide interlocking lugs and recesses that are held in locking position by the elasticity of the sheet metal that forms the parts. The invention also has for its object to provide a readily removable attaching bracket that may be used for securing the switch box in position in a building or thing or device. The bracket is made removable in order that the body of the box or the parts that form the body of the box may be manufactured at a low cost and when completed the bracket may be readily attached.

Figure 1:
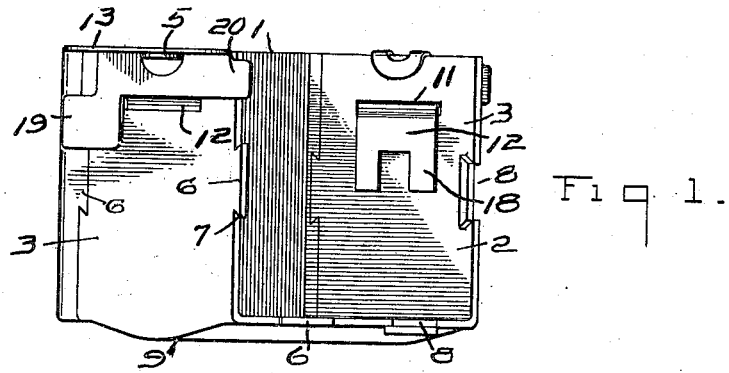
Figure 2:
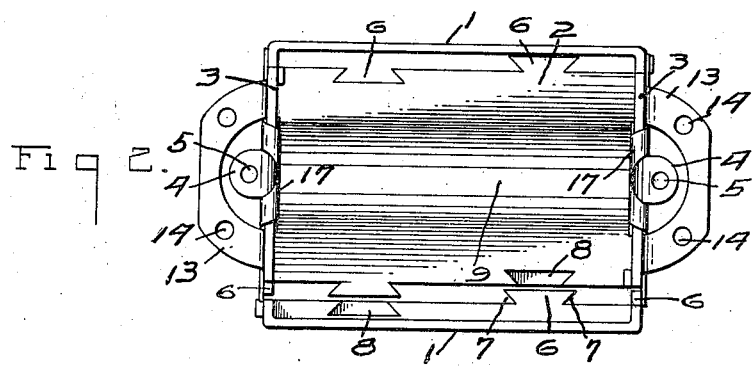
Figure 3:
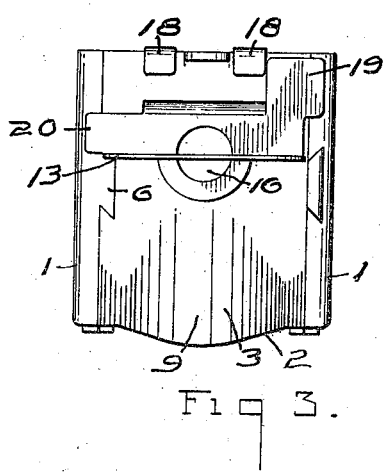
Figures 4, 5:
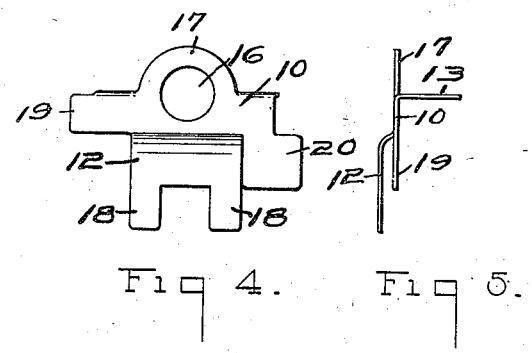
Figure 6:
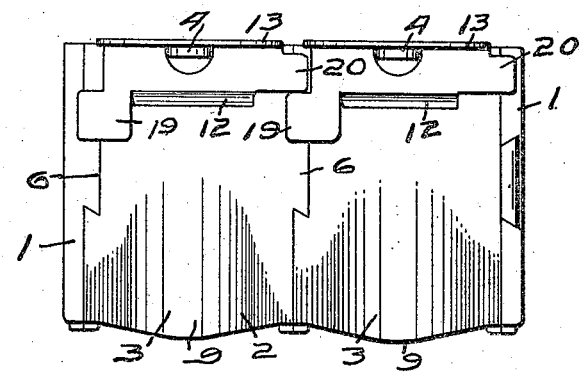
Figure 7:
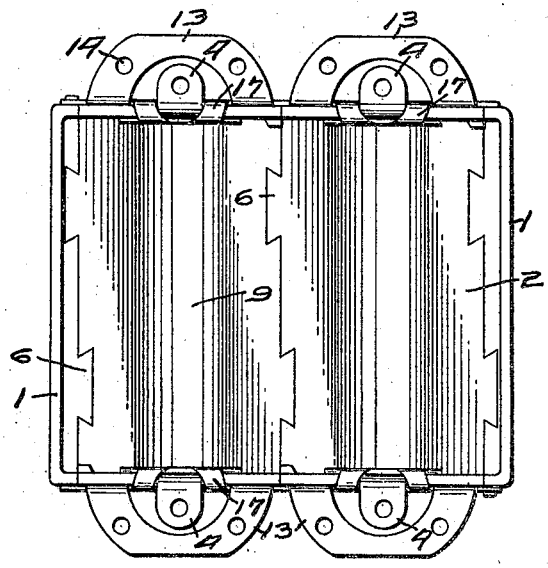

The invention may be contained in structures modified in form and in the details of their construction, and yet such structures may be within the purview of my invention as contained broadly and specifically in the combinations of elements set forth in the appended claims. To illustrate a practical application of the invention I have selected an extensible box as an example of structures containing the invention and shall describe it hereinafter. The box selected is illustrated in the accompanying drawings.
Figure 1 of the drawings is a perspective view looking into an end section of the box. Fig. 2 is a top view of the box, one of the sides being shown in position to be attached or secured to the body portion of the box.
Fig. 3 illustrates an end view of the box having a single section fully assembled. Fig. 4 is a side view of the bracket that is readily placed in position on the box for attaching the switch box in position in a building or other thing or device whereby it may be located in one or two positions relative to the frame or part to which it is secured. Fig. 5 is an end view of the bracket shown in Fig. 4. Fig. 6 illustrates the box extended in size by the addition of a section and shows a box formed of a plurality of sections. Fig. 7 is a top view of the box shown in Fig. 6.

The box is provided with a pair of side parts 1 and one or more sections 2. The ends 3 of the sections are provided with ears 4 having threaded openings 5 for securing the face plate of the switch by means of screws that enter the threaded openings 5 in the manner well known in the art. The edges of the ends of the sections and the edges of the bottom of the sections and the edges of the side parts that adjoin the edges of the sections are provided with tongues 6 having bevelled ends or inclined end edges 7. While corresponding and in registering positions, in the adjoining edge portions of the sections and the sides there are located depressions, forming recesses 8 having the same shape as the tongue 6 and into which the tongues 6 may be readily forced by springing the sections. Once the tongues 6 are placed in position the elasticity of the sheet metal of which the sections are formed hold the tongues in the recesses and the bottoms of the recesses against the tongues and so that the inclined end edges of the tongues and the corresponding surfaces of the recesses are held interlocked.

Where a plurality of sections are used the additional sections are made in the same manner and their contact edges are likewise provided with a tongue and a recess located in the same relative position as the tongue and recess of all the other sections and so that when their edges are placed together and the sections sprung the tongues and recesses will register and interlock when the sections are released. The ends 1 may then be connected to the interconnected sections and the box will be completed except for the face plate of the switch or other instrument to be located on the box.

In order to stiffen the sections so that they will stand tumbling in the finishing of the sections and yet at the same time be sufficiently elastic to yield under pressure to permit the springing of the tongues into the recesses they are bellied along the center line of the bottom and upwards to near a mid-point of the ends of the sections as indicated at 9.

I have provided a removable bracket 10 that may be readily secured in position in the ends of the section or sections that form part or parts of the box. In this way the sections and side parts of the box may be formed at a low cost of production and the brackets may be secured in position when the switch box is to be placed in a building or other thing or device and may be so positioned as to locate the edge of the switch box in one or more desired positions relative to the surface of the wall of the building or single part of another device in which the switch box is to be mounted or supported. The ends 3 of the sections 2 are provided with the slots 11 and the brackets 10 are provided with tongues 12 that may be inserted in the slots 11. The tongues 12 are offset from the body portions of the brackets and so that when the tongues of the brackets are inserted the body portions of the brackets will be located against the outer surfaces of the ends of the section. Each bracket is provided with an outwardly extending flange 13 having openings 14 that may be nailed or otherwise secured to studding or to a frame or other part of a construction of any kind and when the brackets are placed in position on the switch box the switch box will be thus supported in the structure.

The brackets are so constructed that they may be inserted so that when the body portions of the brackets are brought in contact with the surface of the ends of the sections, the tongues 12 will extend either up or down and inasmuch as the securing flange 13 is located at a position slightly remote from the point where the tongue of each bracket is secured to the body portion, the flange 13 will be located the same distance above or below the slot 11, when the bracket is placed in position. This places the edge of the box either flush with the securing flange 13 and substantially flush with the surface to which the flange is secured, or it places the edge of the box in a position which is remote from the surface of the supporting frame or structure to which the flange is secured, and this distance will vary according to the distance that the flange 13 is from the point of juncture of the tongue 12 with the body portion of the bracket. If, therefore, the switch box is to be placed in a building that has already been plastered it may be secured so that the edge of the box will be flush with the plaster by nailing through the plaster and the flanges, or if the box is placed in a building before it has been plastered the brackets may be nailed to the studding or other parts of the building and yet place the edge of the box so that when the plaster has been applied the edge of the box will be flush with the surface of the plaster.

The bracket 10 is provided with portions that may be readily bent over the edge of the box after the bracket has been placed in position. The bracket is provided with an opening 16 through which the lugs or ears 4 may extend when the bracket is placed in one position, and the portion 17 that is struck out of the flange portion 13 may be bent back over the edge of the switch box and so as to be located on each side of the ears 4. The tongues 12 are also provided with a pair of ears 18 which are so disposed that when the brackets are so placed that the tongues 12 extend outward, the ears 18 will be located on opposite sides of the ears 4. The ears 18 may then be readily bent over the edge of the switch box so as to clamp the bracket in position. The bracket is also provided with a portion 19 which extends the body portion of the bracket and thus increases the contact area or surface and tends to hold the bracket in position. The portions 19 are so formed that they will extend over the surface of the adjoining section. Each bracket is also provided with an extended portion 20 which likewise extends the contact area of the body portion of the bracket. The extension 20 also extends over the adjoining section or the edge portion of the side of the box. The portions 19 are so formed as to extend below and yet fit adjoining edges of the extension 20 of the adjoining sections as illustrated in Fig. 5.

I claim:

1. In an extensible box having elastic walls fantailed tenons extending from the edges of the walls of the box and fantailed recesses formed in the edge portions of the walls of the box by depressing the said portions, the said tenons held inter-locked in the depressions by the elasticity of the walls.

2. In an extensible switch box, a plurality of elastic sections, end parts having flanges conforming to the edges of the sections, the edges of the sections and of the end parts having fantailed tongues and recesses, the tongues of one part or section fitting the recesses of the adjoining part or section.

3. In an extensible switch box, end parts and one or more elastic sections, the edges of the end parts and the sections being provided with fantailed tenons extending from the edges of the sections, and fantailed recesses formed in the sections and end parts by depressing edge portions, the said tenons held interlocked in the depressions by the elasticity of the sections.

In testimony whereof, I have hereunto signed my name to this specification.

FREDERICK A. TEFFT.